United States Patent [19]

Nelligan

[11] 3,859,524
[45] Jan. 7, 1975

[54] METHOD AND APPARATUS FOR AUTOMATIC CORRECTION OF MEASURED THERMAL NEUTRON DECAY TIME

[75] Inventor: William B. Nelligan, Danbury, Conn.

[73] Assignee: Schlumberger Technology Corporation, New York, N.Y.

[22] Filed: May 26, 1972

[21] Appl. No.: 257,462

Related U.S. Application Data

[63] Continuation of Ser. No. 861,103, Sept. 25, 1969, abandoned.

[52] U.S. Cl. ................................. 250/262, 250/270
[51] Int. Cl. .............................................. G01t 1/16
[58] Field of Search ......... 250/83.6 W, 83.3 R, 262, 250/269, 270

[56] References Cited
UNITED STATES PATENTS

| | | | |
|---|---|---|---|
| 3,405,349 | 10/1968 | Moran | 250/83.6 W X |
| 3,508,052 | 4/1970 | Seevers | 250/83.6 W X |
| 3,538,329 | 11/1970 | Niven, Jr. | 250/83.6 W X |

OTHER PUBLICATIONS

Jackson, A., Analog Computation, pp 488–489, McGraw Hill, N.Y., 1960.

*Primary Examiner*—Archie R. Borchelt
*Assistant Examiner*—Davis L. Willis
*Attorney, Agent, or Firm*—Brumbaugh, Graves, Donohue & Raymond

[57] ABSTRACT

An illustrative embodiment of the invention discloses a technique for converting pulse neutron measurements of certain parameters relating to properties of strata adjacent to a well bore into more accurate indications of those properties. More particularly, thermal neutron decay time measurements, which are usually indicative of the chemical compositon of formation fluids, have been subject to hitherto unrecognized sources of error. These measurement conversions are accomplished through the application of predetermined factors derived from parameters that introduced the errors into the measurements. Typically, a compensation is made for the borehold or casing pipe diameter and the salinity of the fluid in the borehole to establish a more accurate indication of the neutron properties of adjacent formations.

10 Claims, 4 Drawing Figures

Patented Jan. 7, 1975

William B. Nelligan
INVENTOR

Patented Jan. 7, 1975

William B. Nelligan
INVENTOR

METHOD AND APPARATUS FOR AUTOMATIC CORRECTION OF MEASURED THERMAL NEUTRON DECAY TIME

This is a continuation, of application Ser. No. 861,103 filed Sept. 25, 1969, and now abandoned.

FIELD OF THE INVENTION

This invention relates to the measurement and conversion of the characteristic neutron time constants of an unknown material such as the decay time of thermal neutrons therein, and more particularly to a new and improved method for converting a measured thermal neutron decay time into a second thermal neutron decay time more nearly representative of the chemical composition of formations under investigation, and the like.

DESCRIPTION OF THE PRIOR ART

One suggested procedure for determining the character of unknown materials such as the earth formations through which a well bore passes comprises irradiating the material with neutrons for a selected period of time and then determining the concentration of neutrons in the material at selected times after irradiation so that a characteristic neutron time constant of the material may be ascertained. Because the various elements have different probabilities for thermal neutron capture, change in the thermal neutron concentration with time following irradiation will be different for materials containing different elements so that a determination of the rate of capture can be used to give an indication of the type of material irradiated. Usually this neutron characteristic of the material is expressed as the thermal neutron decay time, which is the time required for the thermal neutron concentration to decrease by a factor equal to the reciprocal of the natural logarithm base, $e$, which is 2.718. In another procedure, the characteristic of the material known as the neutron slowing down time is determined by measuring the concentration of higher energy neutrons at various times after irradiation.

It is known, for example, in well logging that the measured thermal neutron decay time sometimes is in error. In order to improve the accuracy of pulse neutron logging techniques, it is necessary to identify and compensate for causes of error.

Borehole conditions are usually identified as one of these major error sources. It was suggested that a delay of one hundred or more microseconds after the termination of each neutron pulse before commencing the neutron concentration observations would enable these borehole influences to dissipate and not adversely affect the measurement. In spite of this precaution, some error continues to exist.

Accordingly, a need exists for an improved method and apparatus for obtaining a more precise indication of the thermal neutron decay time of strata adjacent to a borehole.

Thus it is an object of the invention to provide an improved method and apparatus for measuring various characteristics of earth formations.

It is another object of the invention to provide an improved method for measuring a time-dependent neutron population in order to identify that portion of the neutron distribution that is indicative of the formation characteristic under investigation to the substantial exclusion of other influences.

SUMMARY

In accordance with the invention, pulse neutron measurements of earth formation properties are compensated for heretofore unsuspected residual errors caused by borehole fluid salinity, casing diameter and borehole size.

Owing to the effect of the various parameters influencing the measure of thermal neutron decay time such as the effect of the material within the well bore, the casing fluid salinity and the casing diameter, it has been found that the decay at the end of each neutron pulse before measuring the characteristic neutron time constants (such as thermal neutron decay time of formation material) was not entirely adequate.

One aspect of the invention provides for the direct compensation of the measured thermal neutron decay time for these borehole or casing conditions. More particularly, a family of correction or departure curves for borehole or casing diameter and borehole salinity is derived under a variety of conditions so that a given value of the measured decay time can be multiplied by a suitable correction factor in order to yield a more accurate value.

In the application of this method of obtaining a corrected thermal neutron decay time, that which is sought is designated as the intrinsic thermal neutron decay time. It is so designated for the reason that the relative rate of decay of the thermal neutron population within any formation is an intrinsic characteristic of the chemical elements in the formation.

A typical neutron tool in which the bursts and detection intervals are regulated to obtain the thermal neutron decay time measurement to be corrected in a manner consistent with the present invention is described more fully in U.S. Pat. application Ser. No. 592,795 filed Nov. 8, 1966, for "Method and Apparatus for Measuring Neutron Characteristics of a Material" by William B. Nelligan now U.S. Pat. No. 3,566,116. This patent application is assigned to the same assignee as the invention described herein. Thus, the present invention is directed, for example, to a digital or analog computer circuit that operates on the thermal neutron decay time signal measured, e.g., with the aforementioned Nelligan tool in accordance with predetermined correction factors to provide the intrinsic thermal neutron decay time.

For a better understanding of the present invention together with other and further objects thereof, reference is had to the following description taken in connection with the accompanying drawings, the scope of the invention being pointed out in the appended claims.

DESCRIPTION OF THE PREFERRED EMBODIMENTS

Figure 2:
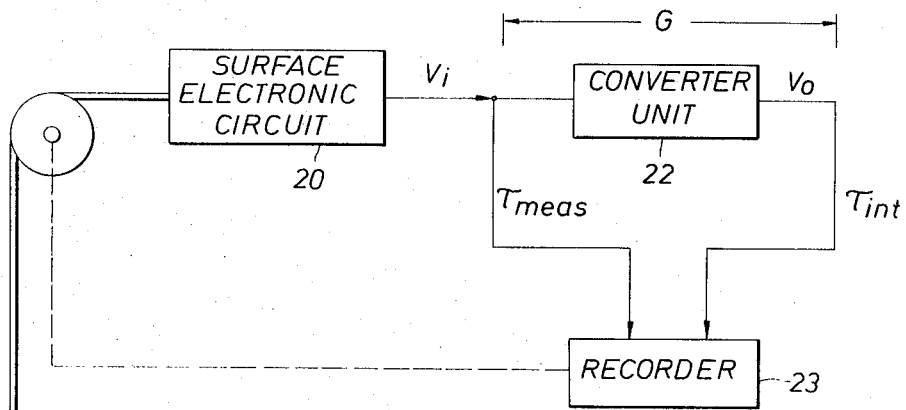
FIG. 2 is a schematic block diagram illustrating a representative apparatus for measuring thermal neutron decay times, converting them to intrinsic thermal neutron decay times, and displaying both values according to the invention.

Depicted in FIG. 2 is a well logging tool 15 shown lowered in a well bore 17 that is lined with a casing 16. A pulsed neutron source 13 is repetitively energized causing formations adjacent to the well bore 17 to be irradiated with neutrons. A radiation detector 14 registers the neutron concentration in a formation 19. Typically, gamma radiation emitted in response to thermal neutrons absorbed in some of the nuclei that comprise the formation 19 produces a response in the detector 14 which sends signals related to the detected gamma radiation through a cable 18 to surface circuits 20 for analysis and derivation of measured thermal neutron decay time.

In order to discuss more fully the advantages of the present invention, the manner in which neutron decay time measurements are obtained is described. Readings are obtained by measuring the rate of change of the neutron intensity so as to indicate the characteristic neutron time constant of the material at a time after neutron irradiation which is dependent upon the characteristic time constant of the material. A subsequent conversion of the measurement obtained is required, according to the principles of the invention, in order that the value obtained through the measurement might more accurately express the true characteristic time constant. In this way, thermal neutron decay time measurements, for example, can be made at the proper time for all materials regardless of whether the thermal neutron concentration decreases rapidly or slowly and values obtained in this manner may be corrected to eliminate the parameters that influence the indications received. Moreover, the duration of the time intervals during which the characteristic neutron time constant measurements are made is also varied in accordance with the time constant of the material so that the ratio of the neutron counting rate during two measuring intervals between successive pulses of neutrons is a predetermined number when the length of the measurement time intervals is properly selected. For optimum operation, the duration of the neutron irradiation intervals is also proportional to the time constants.

In a particular embodiment for thermal neutron decay time measurements utilizing continuously repetitive bursts of neutrons spaced at intervals about nine decay times in length, a first thermal neutron count is taken during an interval one decay time long which begins two decay times after the irradiation has stopped and a second thermal neutron count is taken during a second interval immediately after the first interval which is two decay times long. Preferably, the thermal neutron intensity may be measured by a detector which detects the thermal neutron capture gamma rays produced in the formation. With this type of detector, it is preferable to take a background count during an interval beginning at least seven decay times after the neutron irradiation has stopped. This background count is subtracted from both of the first and second interval counts in proportion to their duration.

In the foregoing technique, when the adjacent time intervals are properly set at one and two decay times, respectively, the ratio of the counting rate in the first interval to the counting rate in the second interval is a fixed number, 1.99. Consequently, the time intervals are adjusted in a two to one ratio until the ratio of counting rates equals 1.99 and the delay between irradiation and measurement is adjusted to be twice the first time interval.

In this embodiment, the returned signal is an electrical analog of the physical measurement of a decay time disregarding, to some degree, those parameters that adversely influence all such measurements taken in a well bore. The application of departure correction curves compiled through careful observation in formations of known composition, according to the present invention, yields a corrected intrinsic decay time and provides a second signal representative of this corrected time measurement.

Apparatus for determining thermal neutron decay times, according to the invention, includes a variable oscillator for initiating and terminating the measurement intervals. The period of this oscillator determines the ratio of thermal neutron counting rates in the first and second intervals. Preferably, the oscillator controls two gates arranged to transmit pulses from a radiation detector during the first and second intervals and also operates a third gate at a later time to provide background count information. The background counting rate is subtracted from the counting rates during the first and second time intervals and a ratio detector computes the ratio of the net counting rates. A difference circuit responds to any difference between the measured counting rate ratio and the value which must result when the duration of the first and second intervals is one and two decay times, respectively, and adjusts the oscillator in the proper direction to eliminate any difference.

Having thus obtained a measured thermal neutron decay time, the intrinsic thermal neutron decay time is derived through the means of converter circuitry which comprises an operational amplifier and a diode-resistor network which is so designed as to provide an overall resistance which is a series of linear approximations of the transfer function required to change an input signal representing the measured decay time into a signal representing the intrinsic decay time. For a further discussion and derivation of the technique and apparatus used in obtaining a measured thermal neutron decay time, reference might be made to U.S. Pat. application Ser. No. 592,795 now U.S. Pat. No. 3,566,116 granted to W. Nelligan on Feb. 23, 1971.

An alternative method for deriving the intrinsic thermal neutron decay time is through the application of numerical analysis techniques wherein the error source parameters are determinative of a function representative of the particular correction curve to be approximated. Ideally, this method is implemented on a digital computer.

Figure 1:
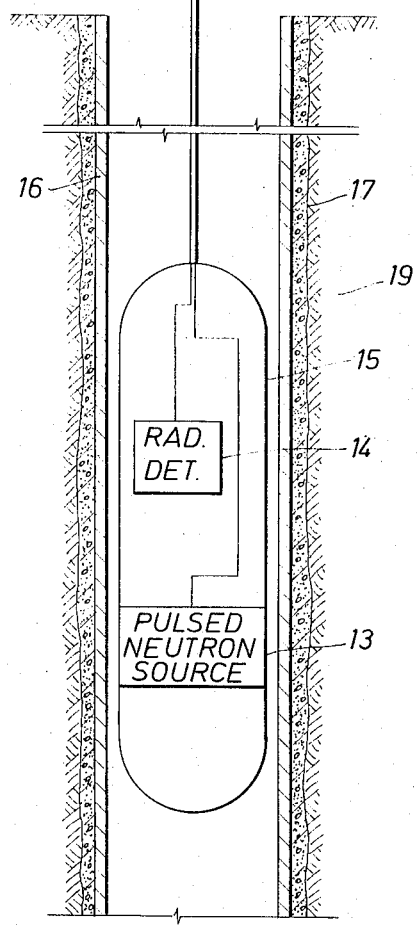
FIG. 1 is a graphical representation illustrating the variation of the correction factor curve, the ratio of intrinsic decay time to measured decay time versus intrinsic decay time, with different values of casing diameters and fluid salinity.
Figure 1:
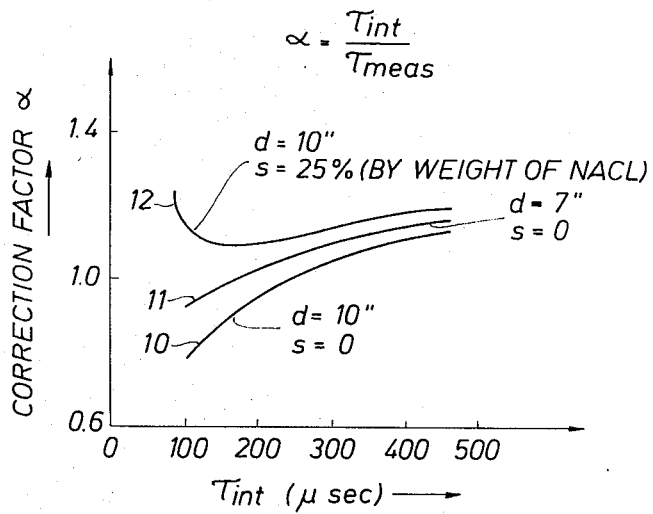

In the graphical representation of FIG. 1, three curves 10, 11 and 12 represent plots of the correction factor which is to be applied to the measured thermal neutron decay time. To understand the significance of the value which is sought to be obtained through application of the correction factor, it should be appreciated that the returned signal is representative of the measured time required for the absorption of thermal neutrons in the formation surrounding the borehole. That which is measured during the detection intervals is the relative number of thermal neutrons remaining in the formation and as indicated, the measure of this relative number under the conditions existing in the borehole is subject to the influence of the salinity of the fluid within the casing and the casing diameter. That which is desired to be determined is the intrinsic decay time, a discussion of which follows:

A factor of considerable interest in determining formation characteristics is the product of the neutron velocity and the macroscopic absorption (capture) cross section (or the linear absorption coefficient) of the medium, or symbolically:

$$v\Sigma_{abs} \quad (1)$$

where $v$ is the neutron velocity and $\Sigma_{abs}$ is the macroscopic absorption cross section and the medium. For most chemical elements of interest in logging, $v$ and $\Sigma_{abs}$ are inversely proportional, so that the quantity $v\Sigma_{abs}$ is a constant characteristic of the formation. When the effect of neutron diffusion is negligible, this constant represents the fraction of thermal neutrons absorbed per unit time at every point in the formation, or the relative rate of decay of the thermal neutron population locally present. It is convenient to use the reciprocal $$\tau_{int} = 1/v\Sigma_{abs} \quad (2)$$

which is the time constant for absorption. Since the time constant is intrinsic to a particular medium, it is referred to as the intrinsic thermal decay time. This value can be determined by measuring the logarithmic slope of the neutron density versus time. This is derived from the following equation:

$$N = N_0 e^{-t/\tau_{int}} \quad (3)$$

where $N_0$ is the thermal neutron density after a delay time following one of the neutron bursts which allows the accelerator neutrons to reach thermal equilibrium, and $t$ is the time elapsed after the initial delay time. Thus, the formation intrinsic decay time may be derived from:

$$1/\tau_{int} = -\delta(\ln N)/\delta t = -1/N \, \delta N/\delta T \quad (4)$$

Under a variety of borehole conditions it has been discovered that the departure of the measured intrinsic decay time from the true or intrinsic formation value is functionally related to a set of known parameters, among which casing size and casing fluid salinity are prominent.

In the graphical representation of FIG. 1, three curves, 10, 11 and 12 represent plots of the correction factor $$\alpha = (\tau_{int}/\tau_{meas}) \text{ plotted as a function of } \tau_{int},$$

where $\tau_{meas}$ is the measured thermal neutron decay time, and where $\tau_{int}$ is the intrinsic thermal neutron decay time.

Figure 3:
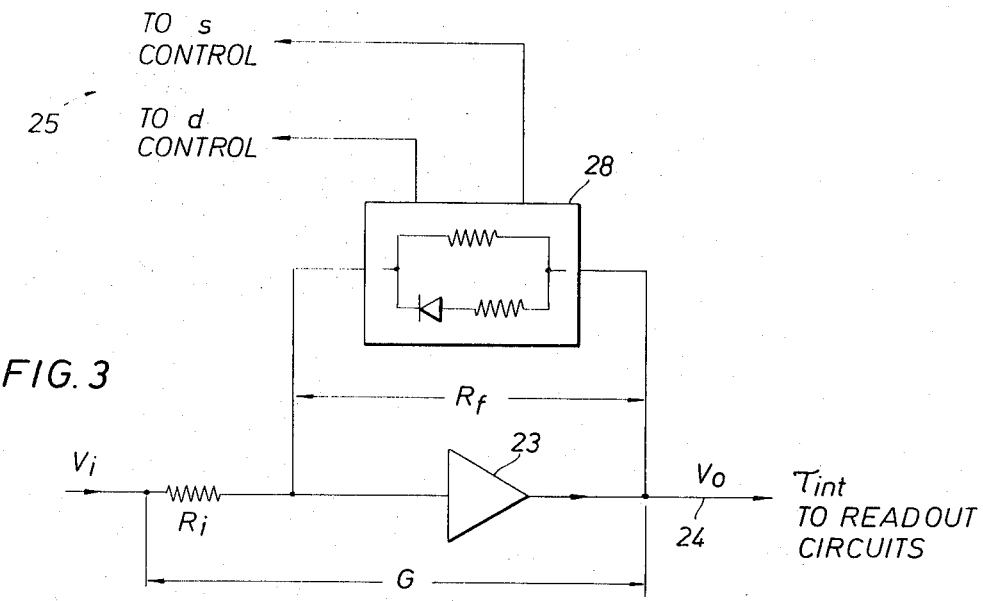
FIG. 3 is a schematic diagram illustrating a more detailed embodiment of the converter unit shown in FIG. 2 and illustrating that circuit parameters may be adjusted to vary the correction curve which is to be applied.

It is readily seen that the correction factor $\alpha$ varies according to the pipe diameter, value $d$, and salinity value, $s$. In accordance with the invention, the correction factor curves are predetermined through experimentation. The parameters $d$ and $s$ are known for any particular logging operation, and, as indicated in FIG. 3, electrical analogs of these parameters may be applied to the converter unit from an external control in order to achieve the desired conversion. The manner in which the variation of the circuit analogs influences the conversion of the measured signal to an output signal representing the intrinsic thermal decay time may be best appreciated by considering first the functional relationship among the variables and a special purpose computing circuit which could be used to implement the method of the present invention.

The relationship among the variables which is represented graphically in FIG. 1 can be stated as follows: for every $d$ and $s$ there exists a unique correction curve which is a plot of the function $\alpha(d, s, \tau_{int})$ such that for every $\tau_{meas}$ a corresponding $\alpha$ may be selected from the conversion curve so that the desired output $\tau_{int}$ may be represented by the expression:

$$\tau_{int} = \alpha(d, s, \tau_{int}) \, \tau_{meas} \quad (5)$$

i.e., the intrinsic thermal neutron decay time may be derived by multiplying the measured thermal neutron decay time by the appropriate conversion factor.

FIG. 2 represents a system block diagram depicting a technique by which the above relationship might be used to automatically compute for every $\tau_{meas}$ a corresponding $\tau_{int}$. An inherent characteristic of this implementation of the method is that a continuous solution or determination is at all times available for display or logging.

To consider this embodiment of an implementation of the described method, it is convenient to define first the parameters of the above relationship in terms of voltages, $V_o$ and $V_i$ processed by converter unit 22, and a transfer function G. Designating the signal input to the converter unit as $V_i$ and the output signal as $V_o$, we have the relationship:

$$V_o = GV_i \quad (6)$$

where the input $V_i$ to the converter unit is representative of $\tau_{meas}$ in such manner that for every $\tau_{meas}$, the relationship $$V_i = k_i \, \tau_{meas} \quad (7)$$

holds; $k_i$ being a predetermined constant.

In order that a converter unit might perform the function of producing a signal $V_o$ which is the electrical or electronic analog of $\tau_{int}$, it is necessary that the transfer function G be at all times determined so that the Equation 6 is analogous to the Equation 5. This may be expressed by the equation:

$$G(d', s', V_o) = k\alpha(d, s, \tau_{int}) \quad (8)$$

where $k$ is a constant, and $d'$ and $s'$ are the circuit analogs of the physical parameters $d$ and $s$.

Given that the transfer function G is to accomplish by circuit analogy a function equivalent to the multiplication of $\tau_{meas}$ by its appropriate multiplicative factor $\alpha$ as expressed in Equation 5, it is necessary to first consider that combination of circuit components which may be used to approximate in a piecewise linear fashion a function varying over a range of applied voltages. From Equations 5, 6 and 8, we see that it is desired that the input and output voltages be related by the equation:

$$V_o = k\alpha(d, s, \tau_{int})V_i \quad (9)$$

or equivalently:

$$V_o = kk_i\alpha(d, s, \tau_{int})\tau_{meas} \quad (10)$$

so that by Equation 5:

$$V_o = kk_i \tau_{int} = k_o \tau_{int} \quad (11)$$

This, then is equivalent to the statement that the output signal shall be proportional to a constant $k_o$ and the intrinsic formation decay time, $\tau_{int}$.

A suitable apparatus for implementing the automatic correction of $\tau_{meas}$ is represented in FIG. 3. The transfer function $G(d', s', V_o)$ is derived from characteristics of the operational amplifier 23 which dictates that the gain is equal to the feedback resistance divided by the input resistance, or:

$$G = R_f/R_i \quad (12)$$

It is realized physically by a diode resistor network 28 in which the diodes are biased in such a manner that the variations in $V_o$ will cause one or more diodes to conduct over a predetermined range of values of $V_o$ while others are not so biased, with the result that:

$$R_f = R_iG(d', s', V_o) \quad (13)$$

is a linear approximation of a portion of the $\alpha$ correction curve selected by adjusting $d'$ and $s'$, having determined $d$ and $s$ beforehand. The values of $d'$ and $s'$ are appropriate to the logging run, and are determined by the corresponding values of $d$ and $s$ selected by an operator through the manipulation of controls on the logging panel. $d'$ and $s'$ may be adjusted in any convenient manner such as varying certain resistors in the network or adjusting voltages through the controls 25 FIG. 4.

By constraining the transfer function G to assume only those values consistent with the Equation 8, it is seen that the conversion of input signal $V_i$ is accomplished in such a manner as to effectively create an output voltage $V_o$ analogous to a converted $\tau_{int}$.

Figure 4:
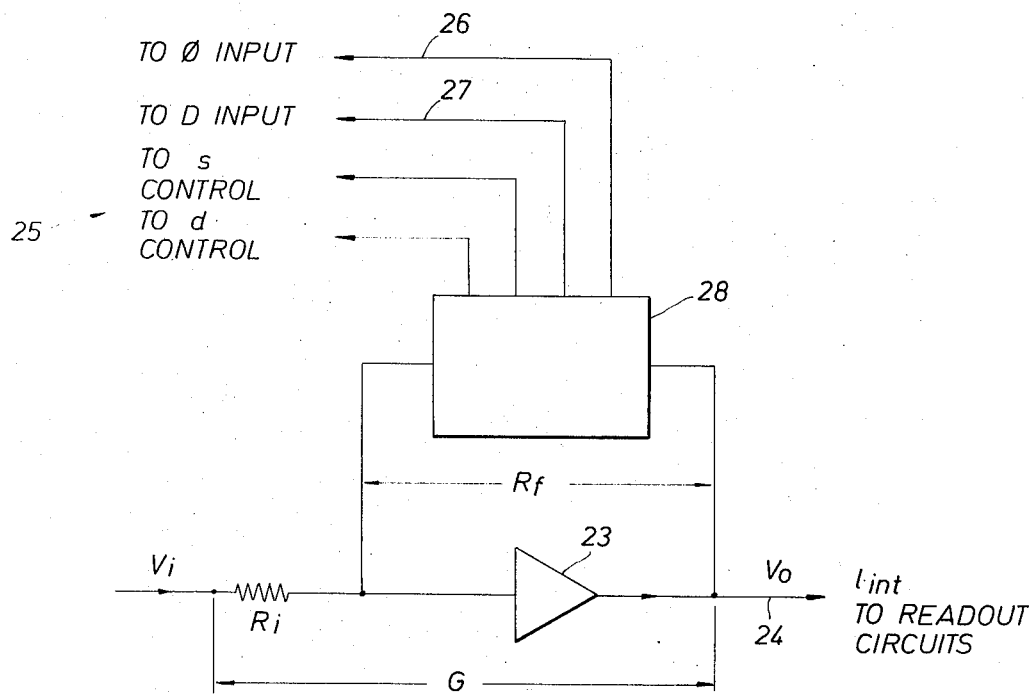
FIG. 4 illustrates a generalization of the scheme depicted in FIG. 2 where additional information is provided to the converter unit to permit corrections for porosity and lithology.

FIG. 4 shows a generalization of the technique of implementing the conversion method as depicted in FIG. 2 wherein alternate parameters are considered in the conversion and hence are supplied through conductors 26 and 27 to the converter unit as depicted. Since these parameters, the neutron diffusion constant D and porosity $\phi$, are known to vary during a logging run, they are represented by signals obtained from anchor logging device simultaneously or from previously recorded logs which measured these formation properties. Diffusion and porosity data ordinarily are acquired through neutron tools that emit a continuous neutron flux, in contrast with the pulsed device described herein. A typical diffusion and porosity logging tool is described in U.S. Pat. application Ser. No. 570,068, filed by Locke, Sherman and Wahl on Aug. 3, 1966 now U.S. Pat. No. 3,483,376.

What is claimed is:

1. A system for correcting a measured neutron property of an earth formation traversed by a borehole comprising, means for irradiating the earth formation with a neutron pulse, detector means for producing a signal that reflects a neutron property of the formation and the borehole that is measured after a delay after the termination of said neutron pulse, in which said delay is related to a function of the measured neutron property, means for producing a representation of a borehole parameter which has adverse effects on the relationship of said detector signal to said formation neutron property, converter means responsive to said detector signal and said borehole parameter representation for compensating said detector signal for the borehole parameter in accordance with a predetermined functional relationship between said borehole parameter and said measured neutron property to produce a resultant signal that indicates a corrected measure of said formation neutron property, and means for recording said corrected measure signal.

2. A system according to claim 1 wherein said borehole parameter comprises one of the borehole size and the borehole salinity.

3. A system according to claim 1 wherein said converter means further comprises an operational amplifier having an input coupled to said measured neutron property signal, and a diode resistor network coupled to said operational amplifier to provide said corrected measure signal at the output of said amplifier.

4. A system according to claim 3 wherein said operational amplifier input further comprises means for adjusting an operating characteristic of said diode resistor network in accordance with the borehole size or the borehole fluid salinity.

5. A system for correcting the thermal neutron decay time of a formation that is traversed by a borehole comprising, means for irradiating the earth formation with a neutron pulse, detector means for producing a signal that reflects the thermal neutron decay time after a delay after the termination of said neutron pulse in which said delay essentially is a function of the thermal neutron decay time, means for producing representations of neutron diffusion and formation porosity, and converter means responsive to said detector signal and said representations for compensating said signal for neutron diffusion and formation porosity to produce a signal that indicates the corrected thermal neutron decay time of the earth formation.

6. A method of correcting a measured neutron property of an earth formation traversed by a borehole, comprising the steps of measuring the borehole size, measuring the borehole fluid salinity, irradiating the earth formation with a pulse of neutrons, generating a signal after a delay after the termination of said neutron pulse that reflects a measurement of the neutron property of the earth formation, and combining representations of said generated signal with said borehole size and salinity measurements to produce a corrected measurement of the earth formation neutron property accounting for said borehole size and said borehole fluid salinity.

7. A method for correcting a measured neutron property of an earth formation traversed by a borehole, comprising the steps of measuring a parameter functionally related to the porosity of the formation, irradiating the formation with a pulse of neutrons, generating a signal representative of a measured neutron property in response to the irradiation after a delay following the termination of said neutron irradiation of the formation, and combining representations of said generated signal with representations of said porosity related parameter in accordance with a predetermined functional relationship between said borehole parameter and said measured neutron property to produce representations of said measured neutron property corrected for porosity.

8. The method of claim 7 further including the steps of generating representations of the borehole size and fluid salinity parameters, and combining said representations of said generated signal with said borehole size and fluid salinity representations to produce a corrected representation of a formation parameter functionally related to a neutron property of the formation.

9. A method for correcting a measured neutron property of an earth formation traversed by a borehole comprising the steps of generating a first signal functionally related to neutron diffusion after neutron generation, irradiating the earth formation with a pulse of neutrons, generating a second signal dependent upon the measured neutron property after a delay following the termination of said neutron pulse of the earth formation, and combining representations of said first generated signal with representations of said second signal to produce a resultant signal corrected for neutron diffusion variations.

10. A method for correcting a measured neutron property of an earth formation traversed by a borehole, comprising the steps of deriving at least one measurement representative of a function of borehole size and salinity, irradiating the earth formation with a pulse of neutrons, generating a signal after a delay after the termination of said neutron pulse that reflects a measurement of the neutron property of the earth formation, and combining representations of said generated signal with said at least one borehole size and salinity function measurement to produce a corrected measurement of the earth formation neutron property accounting for said borehole size and fluid salinity.

* * * * *

UNITED STATES PATENT OFFICE
CERTIFICATE OF CORRECTION

PATENT NO. : 3,859,524
DATED : January 7, 1975
INVENTOR(S) : William B. Nelligan It is certified that error appears in the above-identified patent and that said Letters Patent are hereby corrected as shown below:

In the abstract, line 13, "borehold" should be --borehole--;

Column 2, line 14, "decay" should be --delay--;

Column 3, line 49, "rate" should be --rates--;

Column 6, line 12, "electrical" should be --electronic--.

Signed and sealed this 29th day of April 1975.

(SEAL)
Attest:

RUTH C. MASON
Attesting Officer

C. MARSHALL DANN
Commissioner of Patents
and Trademarks